(12) United States Patent
Colpa et al.

(10) Patent No.: US 11,330,675 B2
(45) Date of Patent: May 10, 2022

(54) METHOD FOR PRODUCING A HEATING CABLE AND HEATING CABLE PRODUCED ACCORDING TO THIS METHOD

(71) Applicant: BACAB S.A., Sainte Croix (CH)

(72) Inventors: Mario Colpa, Onnens (CH); Jean-Luc Therisod, Belmont-sur-Yverdon (CH); Herve de Franceschi, Pontarlier (FR)

(73) Assignee: BACAB S.A., Sainte-Croix (CH)

( * ) Notice: Subject to any disclaimer, the term of this patent is extended or adjusted under 35 U.S.C. 154(b) by 0 days.

(21) Appl. No.: 14/787,474

(22) PCT Filed: Apr. 28, 2014

(86) PCT No.: PCT/CH2014/000054
§ 371 (c)(1),
(2) Date: Oct. 28, 2015

(87) PCT Pub. No.: WO2014/176706
PCT Pub. Date: Nov. 6, 2014

(65) Prior Publication Data
US 2016/0165666 A1 Jun. 9, 2016

(30) Foreign Application Priority Data
May 1, 2013 (CH) .......................... 899/13

(51) Int. Cl.
*H05B 3/56* (2006.01)
*B23K 1/00* (2006.01)
(Continued)

(52) U.S. Cl.
CPC ............. *H05B 3/56* (2013.01); *B23K 1/0016* (2013.01); *B23K 1/20* (2013.01); *B23K 35/262* (2013.01);
(Continued)

(58) Field of Classification Search
CPC ...... B23K 1/0016; B23K 1/20; B23K 35/262; B23K 35/3033; B23K 1/0008;
(Continued)

(56) References Cited

U.S. PATENT DOCUMENTS

| | | | | |
|---|---|---|---|---|
| 4,090,767 A | * | 5/1978 | Tregoning | H01R 9/032 164/108 |
| 4,200,973 A | * | 5/1980 | Farkas | H01B 1/24 219/549 |
| 5,221,815 A | * | 6/1993 | Bostock | H01R 4/723 174/84 C |
| 2004/0253857 A1 | * | 12/2004 | Sakaguchi | H01R 4/20 439/134 |
| 2005/0274716 A1 | * | 12/2005 | Jones | H05B 3/56 219/549 |

(Continued)

FOREIGN PATENT DOCUMENTS

| | | | | |
|---|---|---|---|---|
| DE | 202011051596 U1 | * | 1/2013 | ........... H01R 13/527 |
| FR | 1 407 180 A | | 7/1965 | |

(Continued)

OTHER PUBLICATIONS

English translation of FR 1407180 A.*
English translation of DE-202011051596-U1 (Year: 2013).*

*Primary Examiner* — Ibrahime A Abraham
*Assistant Examiner* — Chris Q Liu
(74) *Attorney, Agent, or Firm* — Gudrun E. Huckett

(57) ABSTRACT

The invention concerns an electric heating cable intended for pipelines. Sections (11a, 12a and 13a) of three phase conductors (11, 12 are 13) are stripped respectively. These sections are intended to be installed and both secured in place and electrically connected to each other inside a box (14) having, for example, a central cavity (15) having a rectangular cross-section, the depth of which is at least equal to the length of the stripped sections (11a, 12a and 13a) and the length of which is preferably greater than the transverse cross-section of these stripped sections of the phase conductors. They are secured in the central cavity (15) with a conductive binder (16), for example a tin solder, in order to ensure they are secured in place and electrically connected to each other.

19 Claims, 2 Drawing Sheets

(51) Int. Cl.
  *B23K 1/20* (2006.01)
  *B23K 35/26* (2006.01)
  *B23K 35/30* (2006.01)

(52) U.S. Cl.
  CPC .... *B23K 35/3033* (2013.01); *H05B 2203/017* (2013.01)

(58) Field of Classification Search
  CPC .......................... B23K 1/002; B23K 2201/32; B23K 35/0222; B23K 3/0475; B23K 3/06; H05B 2203/017; H05B 3/56; H05K 1/11; H01R 4/723; H01R 4/187; H01R 4/22; H01R 43/02; H01R 4/023; H01R 4/183; H01R 4/20; H01R 4/72; H01R 4/726
  USPC ....... 219/544, 545, 549, 529, 535, 528, 541, 219/546, 548, 553, 212, 233, 494, 501, 219/505, 538, 542, 550, 85.16, 85.18, 219/85.22; 228/170; 174/261, 84 R, 174/88 R
  See application file for complete search history.

(56) References Cited

U.S. PATENT DOCUMENTS

| | | | | |
|---|---|---|---|---|
| 2012/0118633 | A1* | 5/2012 | Warner | H01B 7/282 174/84 R |
| 2012/0269996 | A1* | 10/2012 | Jager | E06B 3/6612 428/34 |
| 2014/0322994 | A1* | 10/2014 | Keeven | H01R 13/506 439/886 |

FOREIGN PATENT DOCUMENTS

| | | | | |
|---|---|---|---|---|
| FR | 1407180 A | * | 7/1965 | ............. H01B 3/308 |
| FR | 2 164 706 A1 | | 8/1973 | |
| FR | 2 226 799 A1 | | 11/1974 | |
| GB | 2 197 170 A | | 5/1988 | |
| JP | 2013 514245 | | 4/2013 | |
| KR | 20 2011 0000 602 | | 1/2011 | |
| WO | 2010/032017 A1 | | 3/2010 | |
| WO | 2012/159221 A1 | | 11/2012 | |

* cited by examiner

METHOD FOR PRODUCING A HEATING CABLE AND HEATING CABLE PRODUCED ACCORDING TO THIS METHOD

BACKGROUND OF THE INVENTION

Technical Field

The present invention concerns a method for producing an electric heating cable, in particular for an underwater pipeline-type conduit, this cable comprising a group of phase conductors individually insulated with respect to one another and a star-shaped connection end where the ends of said phase conductors are connected to one another, said cable being covered by an insulating sleeve and coiled in a spiral around said conduit.

The present invention also concerns an electric heating cable, in particular for a pipeline-type underwater conduit, produced according to the above method, this cable comprising a group of phase conductors individually insulated with respect to one another and a star-shaped connection end where the ends of said phase conductors are connected to one another, said cable being covered by an insulating sleeve and coiled in a spiral around said conduit.

Prior Art

Cables of this type are already known in which said connection end of the phase conductors comprises on the one hand phase conductor loops folded back on themselves, and on the other hand a conductive metallic crimping part intended both for pressing the phase conductor loops against another and for electrically connecting the phase conductors to one another.

This embodiment, shown by FIG. 1 that illustrates the closest prior art, creates a substantial additional thickness on the connection end of the phase conductors that must be insulated in this zone, generally by means of a thermo-retractable sleeve. This sleeve is on the one hand difficult to position, and on the other hand, its positioning takes a lot of time.

Furthermore, the security of the joint is not totally guaranteed due to the fact that the positioning of the cable by coiling it in a spiral around the conduit creates substantial stresses which risk detaching the crimping part, and this can lead to poor mechanical strength as well as to a poor electrical connection.

Finally, the slightest imperfection, either as regards the mechanical strength of the crimping part or as regards the electrical connection, may have serious consequences, it being known that the lifespan of conduits surrounded with heating cables must be around twenty years and that these conduits are positioned at a great depth on ocean floors, meaning that it is absolutely impossible to reach them in order to carry out repairs if there is a problem.

The current solutions are therefore associated with both technical and economical disadvantages such that a method that is more reliable as regards mechanical strength and electrical safety, offering furthermore the advantage of simplified and fast positioning of the connection end, makes them of great benefit to the users. The economic benefit of saving time when preparing the connection end is considerable due to the fact that this operation is carried on a specialist ship adapted for the laying of pipelines and the hourly cost for use of which is extremely high.

Various types of heating cable have been produced and are described in prior publications. The international application published under No. WO 2010/032017 A1 describes a self-regulating heating cable made up of a first, a second and a third electrical supply conductor. The first conductor is connected electrically to the second conductor by means of a first electrically conductive heating element that has a first resistance coefficient. The second conductor is connected electrically to the third conductor by means of a second electrically conductive heating element that has a second resistance coefficient. During use the three electrical supply conductors are not interconnected.

French Patent No. 1,407,180 describes a heating cable intended for agriculture, comprising two resistance wires that have different ohm values for different applications and different voltages applied to the wires that are connected to a power source at one end and are connected to one another at their other end. The insulated wires are placed directly in the ground to be heated for growing.

SUMMARY OF THE INVENTION

The present invention proposes overcoming all of the disadvantages mentioned above by producing an economical, effective and reliable heating cable, production of which is very much simplified in comparison to the techniques currently being used.

This aim is achieved by the method according to the invention as defined in the preamble and characterised in that a section with a stripped end of each of said phase conductors as well as a conductive binding agent that is thermofusible and hardens when cold are introduced into at least one central cavity of a box that is open at one end, and in that said sections with stripped ends of said phase conductors are soldered to the inside of said central cavity of said box by means of said binder in order to provide a mechanical and electrical connection between said phase conductors.

According to a first embodiment a box that has a closed bottom and of which said at least one central cavity contains a mass of said cold, hardened binder is used, said box and/or the binder that it contains is/are heated in order to make it/them fluid, said sections with stripped ends of said phase conductors are introduced into the inside of said at least one central cavity and the whole thing is cooled.

According to a second embodiment, a box that has a closed bottom and at least one central cavity is used, said sections with stripped ends of said phase conductors are introduced into the inside of said at least one central cavity, and a predetermined mass of said cold binder that has previously been heated in order to make it liquid is poured into said at least one central cavity containing said sections with stripped ends of said phase conductors.

For this purpose one can advantageously use a binder made from an alloy for soldering to tin or a binder made of an alloy for soldering to nickel.

Preferably, a box made of an electrically conductive metallic material is used.

According to one advantageous embodiment, a box made of an electrically non-conductive material is used.

This aim is also achieved by the cable according to the invention as defined in the preamble and characterised in that said connection end of said phase conductors comprises an open box on at least one end, and comprising at last one central cavity, this box being arranged to receive a section with a stripped end of each of said phase conductors as well as a conductive binder agent that is thermofusible and can harden when cold in order to provide a mechanical and electrical connection between said sections with stripped ends of said phase conductors inside said cavity of said box.

Particularly advantageously, said binder agent comprises an alloy for soldering to tin or an alloy for soldering to nickel.

Said box is preferably made of a metallic material that has a high conductivity coefficient.

According to a first embodiment, said box comprises a common central hollow for the stripped conductor sections.

According to a variant, said box comprises a number of cavities respectively dedicated to said stripped conductor sections, soldered individually in the respective cavities.

BRIEF DESCRIPTION OF THE DRAWINGS

The present invention and its main advantages will become clearer from the description of different embodiments, with reference to the attached drawings in which.

DESCRIPTION OF PREFERRED EMBODIMENTS

Figure 1:
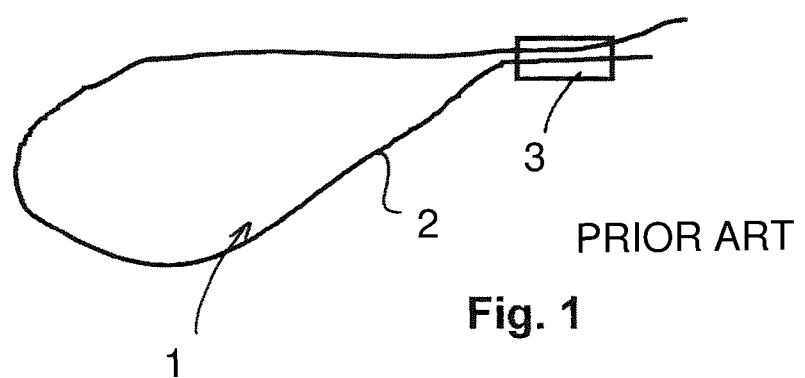
FIG. 1 shows a diagrammatic view of an embodiment known according to the prior art and which is currently used within the framework of an application as a heating cable for pipelines.

Currently, the pipelines are equipped with a heating cable that is coiled in a spiral on the outside of the conduit, fixed at regular intervals to this conduit by straps, the whole thing being covered with an insulating envelope. The heating cable normally comprises three phase conductors that are each stripped on an end section and which are connected in a star shape. In practice, the end sections are individually stripped over a certain length, are folded back on themselves and crimped by means of a crimping strap. Given the diameter of the phase conductors, the creation of a loop by folding back a conductor section, the connection of three similar loops creates a substantial additional thickness that the operator must insulate before incorporating it into the peripheral wall of the conduit. The installation is weakened due to the very existence of this additional thickness that also weakens the insulating envelope that will be positioned around the pipeline. FIG. 1 shows diagrammatically a phase conductor 2 loop 1 folded back and crimped by means of a crimping strap 3.

Figure 2:
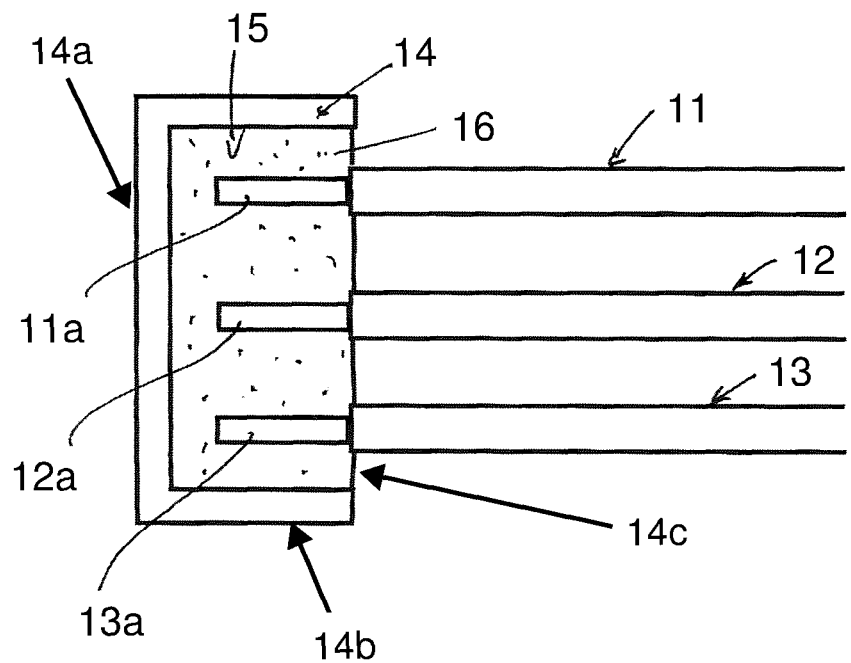
FIG. 2 is a longitudinal sectional view of a preferred embodiment of the joint zone of the phase conductors of the cable according to the invention.
Figure 3:
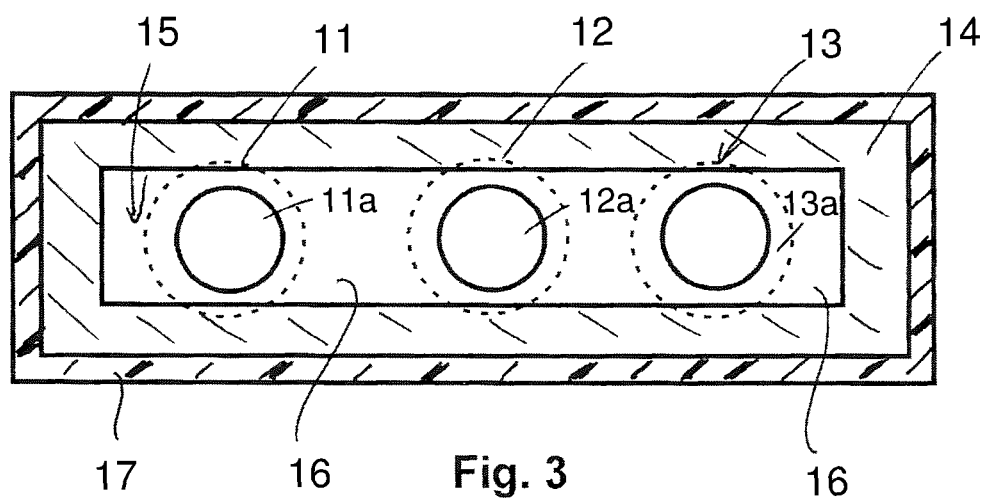
FIG. 3 is a cross-sectional view of the preferred embodiment of the joint zone of the phase conductors of the cable according to the invention and FIG. 3a shows a modification.

The solution provided by the invention makes it possible to eliminate said weakening and to make the connection far more efficient and quick. The longitudinal sectional view of FIG. 2 and the cross-sectional view of FIG. 3 show an embodiment of the connection of the phase conductors according to the invention. In the example shown, three phase conductors 11, 12 and 13 are respectively stripped on sections 11a, 12a and 13a. These sections are intended to be positioned and fixed mechanically on the one hand, and connected electrically to one another on the other hand, inside a box 14 that has, for example, a hollow with a rectangular section, forming at least one central cavity 15 the depth of which is as a minimum equal to the length of the stripped sections 11a, 12a and 13a, and the length of which is preferably greater than the cross-section of these stripped phase conductor sections. There can be just one central cavity or it can be sub-divided into several sub-cavities by partitions. However, it is essential that the phase conductors are coupled electrically to one another, either directly by a conductive binder or by the conductive binder and the walls of the box, provided that the material from which the box is made is also conductive.

The box 14 comprises a bottom 14a and a sidewall 14b and has an open end 14c. The bottom 14a and the sidewall 14b define a cavity 15. The box 14 can be made of a conductive material, for example a copper alloy. It can also be made of a non-conductive material, for example ceramic or similar. The cavity 15 is intended to contain a conductive connecting material 16, for example a tin-based soldering alloy or a nickel-based soldering alloy, or similar for example. Two specific cases can be shown: either the binder is initially contained in the cavity or the sub-cavities, and it has to be heated in order to melt it so as to bring its cold solid state to its hot liquid state, or it will be poured, hot, into the cavity, or the sub-cavities, in which the stripped phase conductor sections will have been placed beforehand. In the first case, upon positioning the stripped conductor sections 11a, 12a and 13a, the box 14 is heated until the conductive connecting material 16 melts, and this makes it possible to securely connect said sections to the box 14 and to provide the electrical coupling between the phase conductors. In the second case, the stripped conductor sections 11a, 12a and 13a are introduced into the hollow 15 which is empty, and the conductive connecting material 16 is poured in the liquid state, after preliminary heating, into the box in order to fix said phase conductors and to connect them electrically to one another. The three conductors are juxtaposed and the only additional thickness is that of the wall of the box 14 which can be reduced to the minimum. The electrical connection is perfect and the stability of the connection is guaranteed.

The view of FIG. 3 shows, furthermore, an insulating sleeve 17 that is located around the outer wall of the box 14 in order to provide the electrical insulation of the connection of the three phase conductors 11, 12 and 13.

Figure 3A:
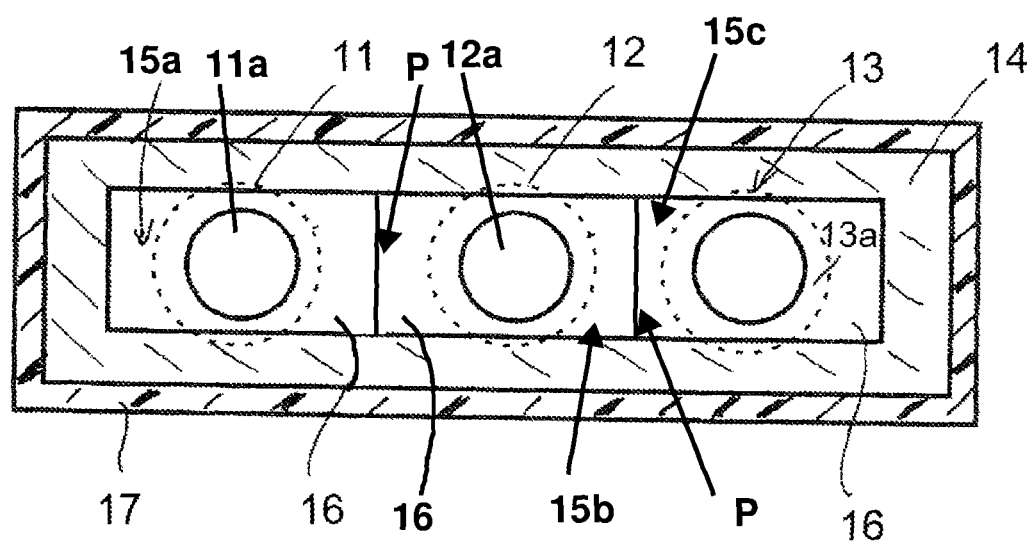

In the example illustrated in FIG. 3, the box comprises a common central hollow 15 for the three stripped conductor sections 11a, 12a and 13a. According to one version, the hollow can be sub-divided (see FIG. 3a, partitions P) into three cavities 15a, 15b, 15c dedicated respectively to the three stripped conductor sections 11a, 12a and 13a, soldered individually in the respective cavities. Since the box is made of a conductive material such as, for example, a copper alloy, the quality of the electrical connection of the three phase conductors is guaranteed.

The present invention is not limited to the embodiments described, but can be subject to different modifications or variations. In particular, the practical implementations may be adapted to the intended applications, the materials used then being able to be varied according to these applications.

What is claimed is:

1. An electric heating cable comprising:
   three phase conductors individually insulated relative to one another by an insulation and each comprising a stripped end from which the insulation has been stripped;
   a box, comprised of a metallic material or a ceramic, the box comprising a closed bottom and a sidewall connected to the closed bottom, wherein the closed bottom extends perpendicular to a longitudinal direction of the three phase conductors, and wherein the sidewall, viewed in a longitudinal section view, extends in the longitudinal direction, wherein the closed bottom and the sidewall delimit at least one cavity and wherein the box has an open end positioned opposite the closed bottom and spaced apart from the closed bottom in the longitudinal direction;

the three stripped ends introduced from the open end of the box into the at least one cavity, wherein the three stripped ends arranged in the at least one cavity are spaced apart from each other across an entire length of the three stripped ends in a direction perpendicular to the longitudinal direction of the three phase conductors;

a solid thermofusible conductive binding agent that is disposed in the at least one cavity and provides a mechanical and electrical connection between the three stripped ends of the three phase conductors inside the at least one cavity and the three stripped ends are electrically connected by the thermofusible conductive binding agent in a star connection end, wherein the three phase conductors terminate inside the box and project from the solid thermofusible conductive binding agent at the open end of the box, and wherein the box with the closed bottom together with the solid thermofusible conductive binding agent is the end of the electric heating cable where the electric heating cable ends viewed in the longitudinal direction, wherein the at least one cavity has a depth that is at least equal to a length of the three stripped ends of the three phase conductors;

wherein the at least one cavity of the box comprises a plurality of cavities, wherein each one of the three stripped ends has one of the cavities associated therewith, and wherein the three stripped ends are individually soldered by the solid thermofusible conductive binding agent in the associated cavities, respectively.

2. The cable according to claim 1, wherein the thermofusible conductive binding agent comprises a tin-based soldering alloy.

3. The cable according to claim 1, wherein the thermofusible conductive binding agent comprises a nickel-based soldering alloy.

4. The electric heating cable according to claim 1, wherein the three stripped ends are introduced into the thermofusible conductive binding agent disposed in the at least one cavity when the thermofusible conductive binding agent is made fluid by heating and the three stripped ends are fixed in the thermofusible conductive binding agent when the thermofusible conductive binding agent solidifies upon cooling.

5. The electric heating cable according to claim 1, wherein the three stripped ends are parallel to each other.

6. An electric heating cable comprising:

three phase conductors individually insulated relative to one another by an insulation and each comprising a stripped end from which the insulation has been stripped;

a box comprising a closed bottom and a sidewall connected to the closed bottom, wherein the closed bottom extends perpendicular to a longitudinal direction of the three phase conductors, and wherein the sidewall, viewed in a longitudinal section view, extends in the longitudinal direction, wherein the closed bottom and the sidewall delimit at least one cavity and wherein the box has an open end positioned opposite the closed bottom and spaced apart from the closed bottom in the longitudinal direction, wherein the box consists of an electrically conductive metal;

the three stripped ends introduced from the open end of the box into the at least one cavity, wherein the three stripped ends arranged in the at least one cavity are spaced apart from each other across an entire length of the three stripped ends in a direction perpendicular to the longitudinal direction of the three phase conductors;

a solid thermofusible conductive binding agent that is disposed in the at least one cavity and provides a mechanical and electrical connection between the three stripped ends of the three phase conductors inside the at least one cavity and the three stripped ends are electrically connected by the thermofusible conductive binding agent in a star connection end, wherein the three phase conductors terminate inside the box and project from the solid thermofusible conductive binding agent at the open end of the box, and wherein the box with the closed bottom together with the solid thermofusible conductive binding agent is the end of the electric heating cable where the electric heating cable ends viewed in the longitudinal direction, wherein the at least one cavity has a depth that is at least equal to a length of the three stripped ends of the three phase conductors.

7. The electric heating cable according to claim 6, wherein the three stripped ends are introduced into the thermofusible conductive binding agent disposed in the at least one cavity when the thermofusible conductive binding agent is made fluid by heating and the three stripped ends are fixed in the thermofusible conductive binding agent when the thermofusible conductive binding agent solidifies upon cooling.

8. The electric heating cable according to claim 6, wherein the three stripped ends are parallel to each other.

9. An electric heating cable comprising:

three phase conductors individually insulated relative to one another by an insulation and each comprising a stripped end from which the insulation has been stripped;

a box, comprised of a metallic material or a ceramic, the box comprising a closed bottom and a sidewall connected to the closed bottom, wherein the closed bottom extends perpendicular to a longitudinal direction of the three phase conductors, and wherein the sidewall, viewed in a longitudinal section view, extends in the longitudinal direction, wherein the closed bottom and the sidewall delimit at least one cavity and wherein the box has an open end positioned opposite the closed bottom and spaced apart from the closed bottom in the longitudinal direction;

the three stripped ends introduced from the open end of the box into the at least one cavity, wherein the three stripped ends arranged in the at least one cavity are spaced apart from each other across an entire length of the three stripped ends in a direction perpendicular to the longitudinal direction of the three phase conductors;

a solid thermofusible conductive binding agent that is disposed in the at least one cavity and provides a mechanical and electrical connection between the three stripped ends of the three phase conductors inside the at least one cavity and the three stripped ends are electrically connected by the thermofusible conductive binding agent in a star connection end, wherein the three phase conductors terminate inside the box and project from the solid thermofusible conductive binding agent at the open end of the box, and wherein the box with the closed bottom together with the solid thermofusible conductive binding agent is the end of the electric heating cable where the electric heating cable ends viewed in the longitudinal direction, wherein the at least one cavity has a depth that is at least equal to a length of the three stripped ends of the three phase conductors;

wherein the box comprises an insulating sleeve arranged around an outer wall of the box.

10. The cable according to claim 9, wherein the at least one cavity is a common central hollow for all of the three stripped ends.

11. The electric heating cable according to claim 9, wherein the three stripped ends are introduced into the thermofusible conductive binding agent disposed in the at least one cavity when the thermofusible conductive binding agent is made fluid by heating and the three stripped ends are fixed in the thermofusible conductive binding agent when the thermofusible conductive binding agent solidifies upon cooling.

12. The electric heating cable according to claim 9, wherein the three stripped ends are parallel to each other.

13. A method for producing an electric heating cable, the heating cable comprising three phase conductors individually insulated relative to one another by an insulation, the method comprising:

stripping the insulation from ends of the three phase conductors to provide three stripped ends;

introducing the three stripped ends of the three phase conductors into at least one cavity of a box, comprised of a metallic material or a ceramic, from an open end of the box, arranging in the at least one cavity the three stripped ends so as to be spaced apart from each other across an entire length of the three stripped ends in a direction perpendicular to a longitudinal direction of the three phase conductors, and introducing a thermofusible conductive binding agent into the at least one cavity, the box comprising a closed bottom and further comprising a sidewall connected to the bottom, wherein the closed bottom extends perpendicular to the longitudinal direction of the three phase conductors, and wherein the sidewall, viewed in a longitudinal section view, extends in the longitudinal direction, wherein the closed bottom and the sidewall delimit the at least one cavity and wherein the open end of the box is positioned opposite the closed bottom and spaced apart from the closed bottom in the longitudinal direction, wherein the at least one cavity of the box comprises a plurality of cavities, wherein each one of the three stripped ends has one of the cavities associated therewith;

individually soldering the three stripped ends of the three phase conductors, inserted into the box so as to terminate inside the box, to an inside of the at least one cavity of the box by the solid thermofusible conductive binding agent in the associated cavities, respectively, to produce a mechanical and electrical connection between the three stripped ends of the three phase conductors, and electrically connecting the three stripped ends by the thermofusible conductive binding agent in a star connection end, wherein the three phase conductors are projecting from the solid thermofusible conductive binding agent at the open end of the box and the box with the closed bottom is the end of the electric heating cable where the electric heating cable ends viewed in the longitudinal direction, wherein the at least one cavity has a depth that is at least equal to a length of the three stripped ends of the three phase conductors.

14. The method according to claim 13, wherein the thermofusible conductive binding agent is introduced into the at least one cavity prior to introducing the three stripped ends and is present as a cold solid mass in the at least one cavity, the method further comprising heating the thermofusible conductive binding agent contained in the at least one cavity to make the thermofusible conductive binding agent fluid, subsequently introducing the three stripped ends into the fluid thermofusible conductive binding agent contained in the at least one cavity, and cooling the thermofusible conductive binding agent together with the introduced three stripped ends to produce the mechanical and electrical connection.

15. The method according to claim 13, wherein the three stripped ends are introduced into the at least one cavity prior to introducing the thermofusible conductive binding agent, the method further comprising heating a predetermined mass of the thermofusible conductive binding agent to make the thermofusible conductive binding agent liquid and pouring the liquid thermofusible conductive binding agent into the at least one cavity containing the three stripped ends.

16. The method according to claim 13, further comprising selecting the thermofusible conductive binding agent from a tin-based alloy for soldering.

17. The method according to claim 13, further comprising selecting the thermofusible conductive binding agent from a nickel-based alloy for soldering.

18. The method according to claim 13, further comprising selecting the box from a box made of an electrically conductive metallic material.

19. The method according to claim 13, further comprising selecting the box from a box made of an electrically non-conductive material.

* * * * *